(12) United States Patent
DeFilippis et al.

(10) Patent No.: US 8,731,134 B2
(45) Date of Patent: May 20, 2014

(54) METHOD AND APPARATUS FOR A BWR JET PUMP INLET MIXER SUPPORT

(75) Inventors: Michael S. DeFilippis, Wilmington, NC (US); Norbert Wroblewski, West Bloomfield, MI (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1010 days.

(21) Appl. No.: 12/851,942

(22) Filed: Aug. 6, 2010

(65) Prior Publication Data

US 2012/0033782 A1    Feb. 9, 2012

(51) Int. Cl.
G21C 15/25    (2006.01)
G21D 1/02    (2006.01)

(52) U.S. Cl.
USPC ............................ 376/372; 376/392; 376/407

(58) Field of Classification Search
USPC ................. 376/285, 461, 407, 403, 392, 372; 248/65, 62; 211/182
See application file for complete search history.

(56) References Cited

U.S. PATENT DOCUMENTS

| | | | | |
|---|---|---|---|---|
| 3,385,545 | A * | 5/1968 | Patton | 248/68.1 |
| 3,389,735 | A * | 6/1968 | Katz | 411/120 |
| 5,515,407 | A * | 5/1996 | Bevilacqua et al. | 376/372 |
| 5,978,433 | A * | 11/1999 | Erbes et al. | 376/372 |
| 6,434,208 | B1 * | 8/2002 | Erbes et al. | 376/260 |
| 6,609,343 | B1 * | 8/2003 | Litten | 52/653.2 |
| 7,272,204 | B2 | 9/2007 | Jensen | |
| 7,515,673 | B2 * | 4/2009 | Jensen et al. | 376/303 |
| 7,596,200 | B2 * | 9/2009 | Jensen | 376/372 |
| 8,194,815 | B2 | 6/2012 | Wroblewski et al. | |
| 8,608,121 | B2 | 12/2013 | Maehara et al. | |
| 2001/0001009 | A1 * | 5/2001 | Wivagg et al. | 376/407 |
| 2008/0251651 | A1 * | 10/2008 | Jackson et al. | 248/62 |
| 2012/0018612 | A1 | 1/2012 | Defilippis | |
| 2012/0032064 | A1 * | 2/2012 | Defilippis et al. | 248/675 |
| 2012/0033781 | A1 * | 2/2012 | DeFilippis | 376/372 |

FOREIGN PATENT DOCUMENTS

| | | | |
|---|---|---|---|
| EP | 2 146 351 A1 | | 1/2010 |
| EP | 2146351 A1 | * | 1/2010 |
| JP | 60-37898 | * | 3/1985 |

(Continued)

OTHER PUBLICATIONS

USPTO Office Action for U.S. Appl. No. 12/839,948 dated Jun. 1, 2012.*

(Continued)

*Primary Examiner* — Jack W Keith
*Assistant Examiner* — Sean P Burke
(74) *Attorney, Agent, or Firm* — Harness, Dickey & Pierce, PLC (57) ABSTRACT

A method and apparatus for a Boiling Water Reactor (BWR) jet pump inlet mixer support that provides rigid support for inlet mixers. The inlet mixer support attaches to a conventional BWR jet pump assembly to pull the inlet mixer away from the centerline of a riser pipe or maintain the existing inlet mixer position. The inlet mixer support may provide redundant support that may otherwise be provided by set screws of a conventional restrainer assembly. The inlet mixer support may, alternatively, be used in lieu of conventional set screws. The inlet mixer support may also counter-act additional side loading that may be applied to inlet mixers to stabilize inlet mixer movement and vibration when the BWR jet pump assembly is in operation. Optionally, the inlet mixer support may also prevent removal of existing restrainer bracket set screws.

6 Claims, 7 Drawing Sheets

(56) References Cited

FOREIGN PATENT DOCUMENTS

| | | | |
|---|---|---|---|
| JP | 62-91294 | * | 6/1987 |
| JP | 1987-91294 | * | 6/1987 |
| JP | 62-170887 | * | 7/1987 |
| JP | 04-357385 | * | 12/1992 |
| JP | 08-201566 | * | 8/1996 |
| JP | 09-053626 | * | 2/1997 |
| JP | 09-133781 | * | 5/1997 |
| JP | 10-282289 | * | 10/1998 |
| JP | 04-357385 | | 12/1999 |
| JP | 2001-187982 | * | 7/2001 |
| JP | 2003-287586 | * | 10/2003 |
| JP | 2004-219102 | | 8/2004 |
| JP | 2004219102 | * | 8/2004 |
| JP | 2005-106162 | * | 4/2005 |
| JP | 2005-194835 | * | 7/2005 |
| JP | 2009-075077 | * | 4/2007 |
| JP | 2007-139597 | * | 6/2007 |
| JP | 2007-183119 | * | 7/2007 |
| JP | 2006-71638 | * | 9/2007 |
| JP | 2008-256586 | | 10/2008 |
| JP | 2008256586 | * | 10/2008 |
| JP | 2010-14674 | * | 1/2010 |
| JP | 2010014674 | * | 1/2010 |
| JP | 2010-138476 | * | 6/2010 |
| JP | 2010138476 | * | 6/2010 |
| JP | 2010-237212 | * | 10/2010 |
| JP | 2011-169315 | * | 9/2011 |
| JP | 2011169315 | * | 9/2011 |

OTHER PUBLICATIONS

JPO Notice of Allowance for Japanese Application No. 2011-169170.*

JPO Office Action for Application 2011-170152 dated Dec. 11, 2013.*

U.S. Office Action dated Oct. 26, 2012 for related copending U.S. Appl. No. 12/850,218.

US Office Action dated Nov. 25, 2011 for co-pending U.S. Appl. No. 12/850,218.

Search report by the Spanish Patent Office for Spanish Application 201131353, dated Oct. 18, 2013.

Publication report by the Spanish Patent Office for Spanish Application 201131353, dated Oct. 22, 2013.

Dec. 17, 2013 Notice of Allowance issued in corresponding Japanese Patent Application No. 2011-169170 (with translation).

Japanese Office Action in Japanese Application No. 2011-170152 dated Dec. 11, 2013.

* cited by examiner

METHOD AND APPARATUS FOR A BWR JET PUMP INLET MIXER SUPPORT

BACKGROUND OF THE INVENTION

1. Field of the Invention

Example embodiments relate generally to nuclear reactors, and more particularly to a method and apparatus for a Boiling Water Reactor (BWR) jet pump inlet mixer support that provide rigid support for inlet mixers. The inlet mixer support may attach to a conventional BWR jet pump assembly to pull the inlet mixer away from the centerline of a riser pipe or support them in there exiting position.

2. Related Art

A reactor pressure vessel (RPV) of a boiling water reactor (BWR) typically has a generally cylindrical shape and is closed at both ends (for example by a bottom head and a removable top head). A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within jet pump restrainer brackets by a gravity actuated wedge. The restrainer brackets support the inlet mixer by attaching the inlet mixer to the adjacent jet pump riser pipe.

The jet pump main wedge maintains contact between the inlet mixer and the jet pump restrainer bracket. More specifically, the wedge works in cooperation with two set screws, which are tack welded to the restrainer bracket to maintain contact with the inlet mixer. The flow of water through the jet pumps typically includes pressure fluctuations caused by various sources in the reactor system. The pressure fluctuations may have frequencies close to one or more natural vibration modes of the jet pump piping. The jet pump piping stability depends on the tight fit-up, or contact, of the restrainer brackets and the inlet mixers. However, the set screws may back out of position if the tack welds that hold the set screws in place fail.

SUMMARY OF INVENTION

Example embodiments provide a method and an apparatus for providing redundant and/or additional contact between the inlet mixers and a restrainer bracket of a BWR jet pump assembly. Specifically, a support band may be used to provide an additional point of contact between an inlet mixer and a support bracket. The support band may be held in place by mixer support mounting blocks that may be attached directly to the restrainer bracket and attach the support band to the restrainer bracket. By securing the support band to the restrainer bracket, the support band may provide an adjustable point of contact between the restrainer bracket and the inlet mixer, thereby stabilizing the inlet mixer even in the event that conventional set screws on the restrainer bracket fail. Therefore, example embodiments maintain the inlet mixer position even if the set screws move out of position. Example embodiments also prevent the removal and/or expensive and time-consuming repair of the set screws, should the set screws fail or otherwise require maintenance.

Example embodiments also provide additional stability in the case where additional side loading of the inlet mixers may be applied through the use of a jet pump support system. Such side loading provides a lateral force that pulls the inlet mixers toward the centerline of a riser pipe of a BWR jet pump assembly. Because conventional set screws are not designed to support such additional lateral loading, example embodiments provide redundant and/or additional stability of the inlet mixers to ensure that potential set screw failure does not lead to unacceptable vibration of the inlet mixers.

Furthermore, auxiliary wedges have conventionally been used to restore points of contact between the inlet mixers and restrainer brackets. The auxiliary wedges fill gaps that form between the set screws and the inlet mixers, thereby restoring stability for the inlet mixers. Example embodiments thereby provide an alternative to the use of auxiliary wedges.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
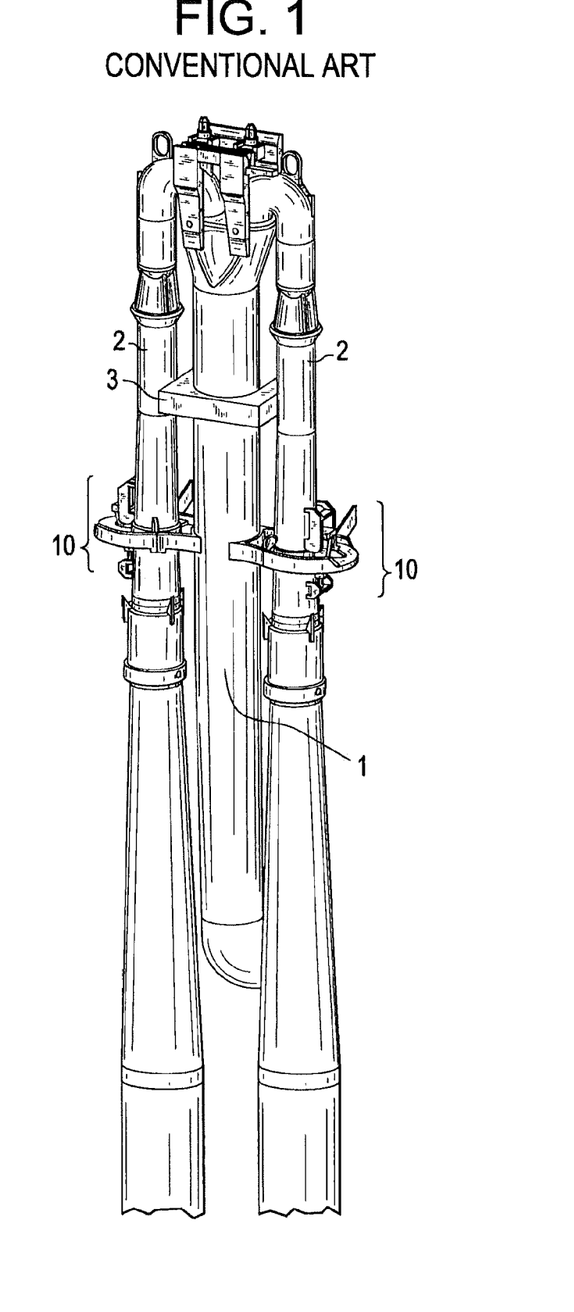
FIG. 1 is a perspective view of a conventional boiling water nuclear reactor (BWR) jet pump assembly.

Referring to FIG. 1, a perspective view of a conventional Boiling Water Nuclear Reactor (BWR) jet pump assembly is depicted. The jet pump assembly includes conventional jet pump restrainer assemblies 10 attached to the riser pipe 1, which stabilize any movement of the inlet mixers 2 relative to the riser pipe 1 while the jet pump assembly is in use.

Figure 2:
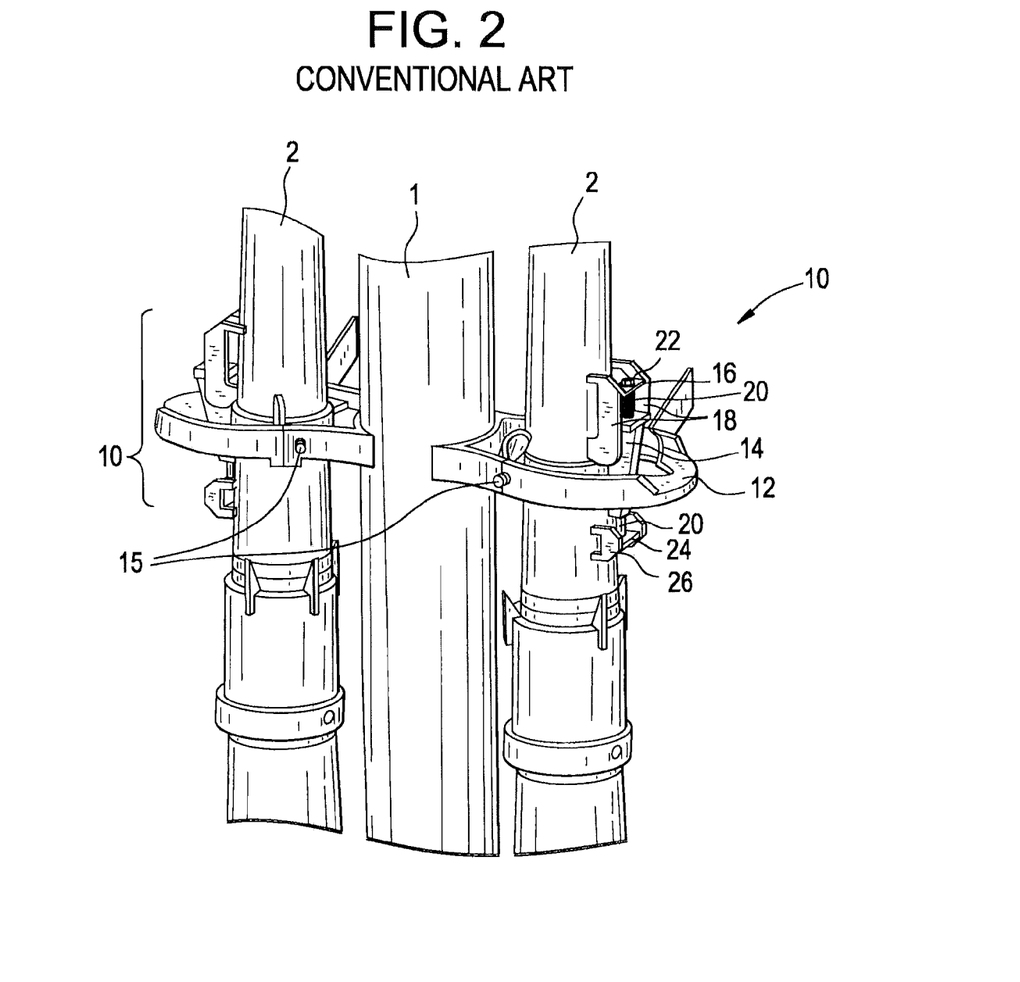
FIG. 2 is a detailed view of a conventional jet pump restrainer assembly.

FIG. 2 shows a detailed view of a conventional jet pump restrainer assembly 10 on a riser pipe 1. The restrainer assembly 10 includes a restrainer bracket 12 connected to the riser pipe 1. Three points of contact locate the inlet mixer 2 in the restrainer bracket 12. The three points of contact are two set screws 15, located approximately between each inlet mixer 2 and the riser pipe 1 (only one set screw 15 is shown, with the other set screw 15 on the back-side of the FIG. 2 image), and the main wedge 14 (the main wedge 14 is the third point of contact). The main wedge 14 assists in ensuring that the restrainer bracket 12 remains against the two set screws 15. The main wedge 14 is free to move vertically along the wedge rod 8 and is held in place between the inlet mixer 2 and restrainer bracket 12 by gravity. The bottom of the wedge rod 20 is held in place by a lower support including two vertical plates 26 and a horizontal plate 24 (notice the bottom of wedge rod 20 penetrates and is held fast on the horizontal plate 20 of the lower support). The top of the wedge rod 20 is held in place by an upper support including two vertical plates 18 and a horizontal plate 16 (notice the top of wedge rod 20 penetrates and is held fast on the horizontal plate 16 via nut 22).

Figure 3:
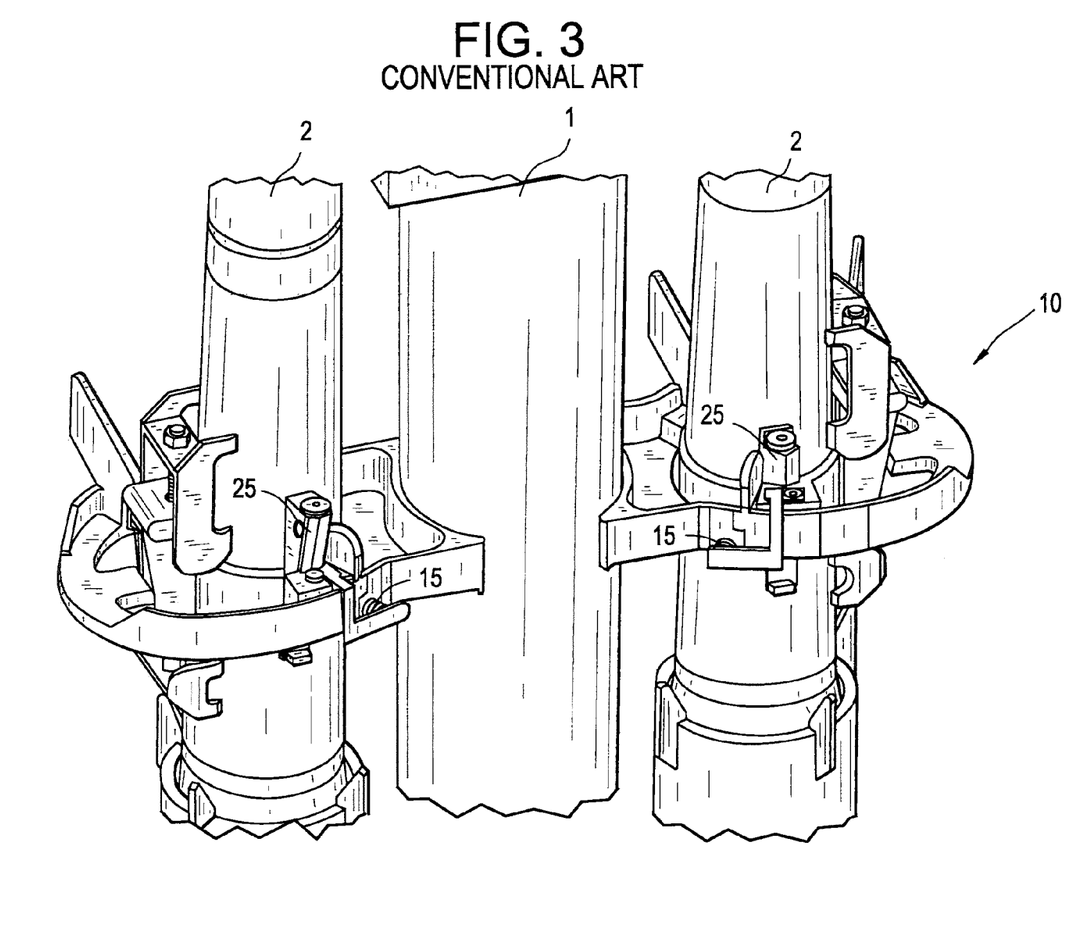
FIG. 3 is a detailed view of a conventional jet pump restrainer assembly with conventional auxiliary wedges.

FIG. 3 is a detailed view of a conventional jet pump restrainer assembly 10 with conventional auxiliary wedges 25. The conventional auxiliary wedges 25 assist in filling any gap that may be created between the set screws 15 and inlet mixers 2, to provide redundant and/or additional stabilization of the inlet mixers 2.

Figure 4:
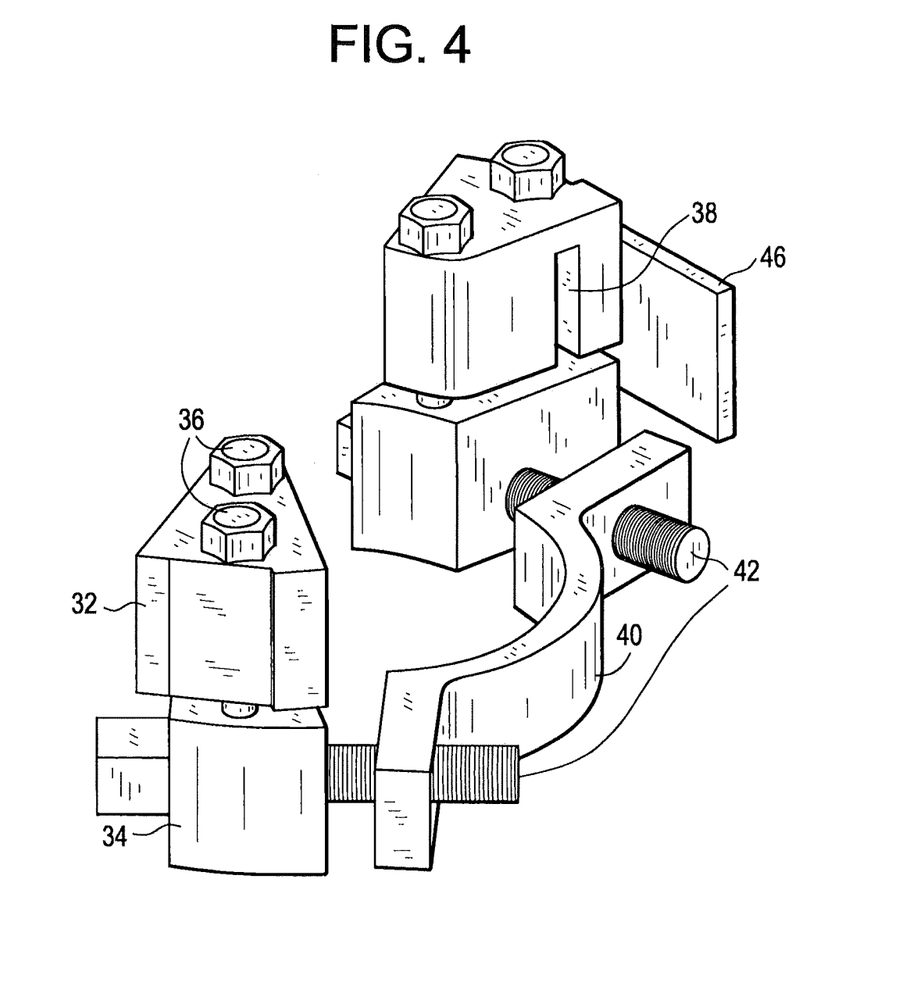
FIG. 4 is a detailed view of a BWR jet pump inlet mixer support, in accordance with an example embodiment.
Figure 5:
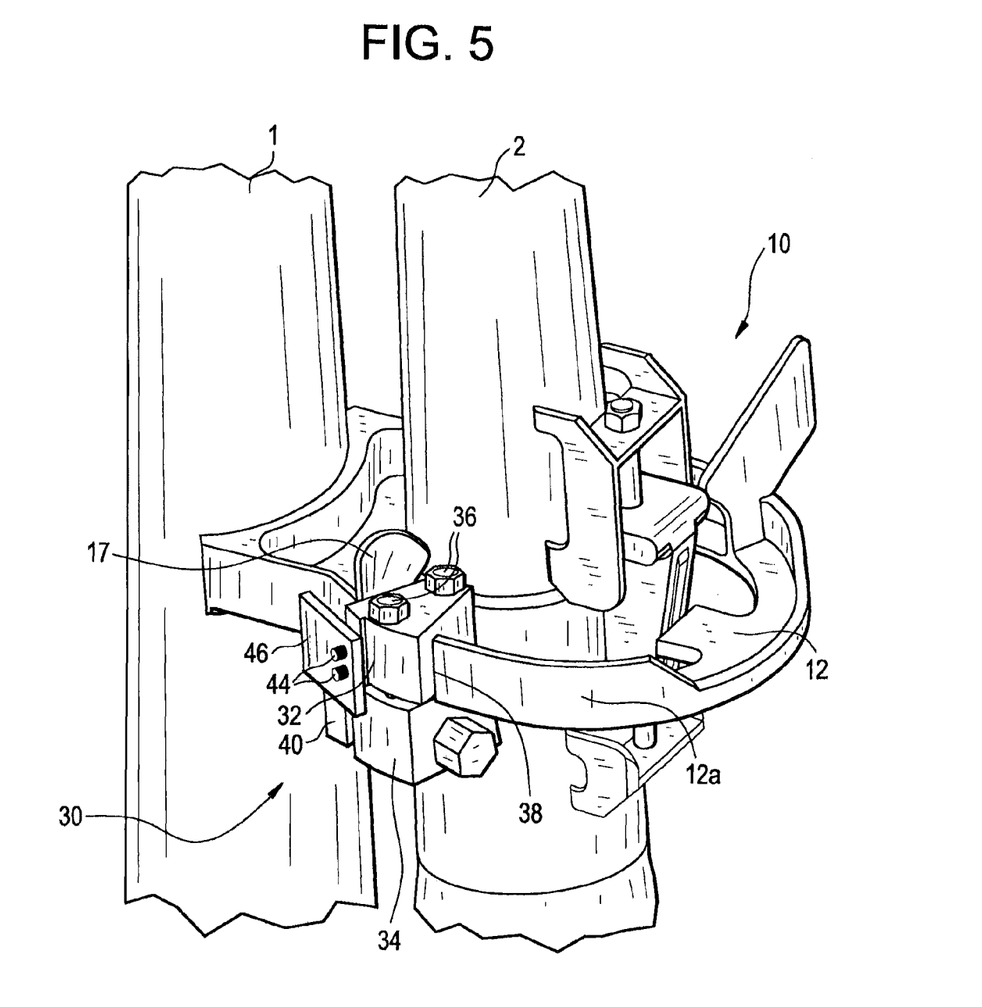
FIG. 5 is a detailed view of a BWR jet pump inlet mixer support in use on a conventional BWR jet pump restrainer assembly, in accordance with an example embodiment.

FIG. 4 is a detailed view of a BWR jet pump inlet mixer support 30, in accordance with example embodiments. The inlet mixer support 30 may include inlet mixer support mounting blocks 32/34 attached to both ends of an inlet mixer support band 40. Specifically, an upper mounting block 32 and a lower mounting block 34 may be provided on both end of support band 40, where the upper/lower mounting blocks 32/34 may be attached to each other via one or more clamping bolts 36. The upper and lower mounting blocks 32/34 and clamp bolts 36 may be used to provide a clamping force to secure the mounting blocks 32/34 onto a conventional restrainer bracket 12 of a BWR jet pump assembly 10, as shown in FIG. 5. Besides using clamping bolts 36, other means of connecting upper and lower mounting blocks 32/34 to each other, and to a restraining bracket 12, may include clamps, a vice, wires, welds, or any other material that may securely fasten the mounting blocks 32/34 to each other and to a restraining bracket 12.

Upper mounting block 32 may include a notch 38 that may be sized to match a thickness of a vertical side wall of a restrainer bracket (shown in better detail in FIG. 5).

Mounting blocks 32/24 may be attached to each end of support band 40 by draw bolts 42. Draw bolts 42 may mate with threaded connections in the lower mounting blocks 34 and support band 40. Alternatively, draw bolts 42 may mate with threaded connections of upper mounting blocks 32, rather than lower mounting blocks 34. Other means of attaching either upper/lower mounting blocks 32/34 to support band 40 may include clamps, a vice, wires, welding, or any other material that may securely connect either one, or both mounting blocks 32/34 to support band 40. The support band may be in the shape of a long slender band that may be shaped with a curvature to fit around the peripheral surface of an inlet mixer 2.

An optional capture plate 46 may be included on an outer surface of either an upper mounting block 32 or a lower mounting block 34. The optional capture plate 46 may be shaped as a thin rectangular plate that may be attached to either the upper or lower mounting blocks 32/34 via bolts 44 (shown in FIG. 5). Other securing means between the mounting blocks 32/34 and the capture plate 46 may include clamps, a vice, wires, welding, or any other material that may securely connect a capture plate 46 to one or both of the mounting blocks 32/34.

All inlet mixer support components may be made of materials that are known to be acceptable for a nuclear environment. For instance, stainless steel (304, 316, XM-19, or equivalent) or nickel based alloys (Iconel, X-750, X-718, or equivalent) may be used.

FIG. 5 is a detailed view of a BWR jet pump inlet mixer support 30 in use on a conventional BWR jet pump restrainer assembly 10, in accordance with example embodiments. Clamping bolts 36 may be used to affix the mounting blocks 32/34 of the inlet mixer support 30 to restrainer bracket 12, as shown in the figure. Notice that notch 38 of upper mounting block 32 allows mounting block 32 to fit snuggly on a vertical wall 12a of restrainer bracket 12. Clamping bolts 36 may then be used to securely fasten the mounting blocks 32/34 directly to restrainer bracket 12. Mounting blocks 32/34 may be attached to restrainer bracket 12 so that a side surface of the mounting blocks 32/34 contacts set screw guide ears 17, causing guide ears 17 to be a physical stop in the event that mounting blocks 32/34 may minutely slide along restrainer bracket 12 while in use. However, it is not necessary that mounting blocks 32/34 be positioned directly near guide ear 17, as mounting blocks 32/34 may alternatively attach to restrainer bracket 12 a distance apart from the location of guide ears 17 (i.e., contact between mounting blocks 32/34 and guide ear 17 is not necessary). The precise location of the mounting blocks 32/34 on restrainer bracket 12 is not entirely critical, as draw bolts 42 may be used to adjust the actual tension that is placed on support band 40. Draw bolts 42 may therefore be adjusted to ensure that support band 40 fits snuggly against the outer surface of inlet mixer 2. The purpose of the draw bolts 42 is to adjust the tension on the support band 40 which acts to pull the inlet mixer 2 away from the centerline of the riser piping 1. Therefore, the tension applied by draw bolts 42 may counter-act any side loading that may be applied to the inlet mixer, where the side loading may be used to pull the inlet mixer toward the centerline of the riser pipe 1.

The use of two mounting blocks 32/34 (i.e., an upper and a lower mounting block) is not necessary. Rather, one mounting block on each end of a support band 40 may be used to securely fasten the support band 40 in place along the peripheral side surface of the inlet mixer 2, through the use of clamps, a vice, wires, welding, or any other material that may securely fasten a single mounting block to the restraining bracket. If a single mounting block is used, the single mounting block may still have a draw bolt penetrating the single block so that tension on the support band 40 may still be adjusted.

In FIG. 5, the optional capture plate 46 is shown attached to upper mounting block 32 via bolts 44. One or more bolts 44 may be used for this purpose, although two bolts 44 are shown in FIG. 5. Additionally, clamps, spot welding, or other means may be used as an alternative to bolts 44. The capture plate 46 may be a thin, rectangular shaped plate that may be positioned to cover set screws 15 (not shown in FIG. 5). The capture plate 46 may provide a physical stop for set screws 15 in the event that the set screws 15 become loose and back out of their holes. In other words, the optional capture plate 46 simply ensures that damaged and/or failing set screws 15 do not fall out of restrainer bracket 12, especially in the case where tack welds fail and set screws 15 back out of their position in the restraining bracket 12.

Figure 6:
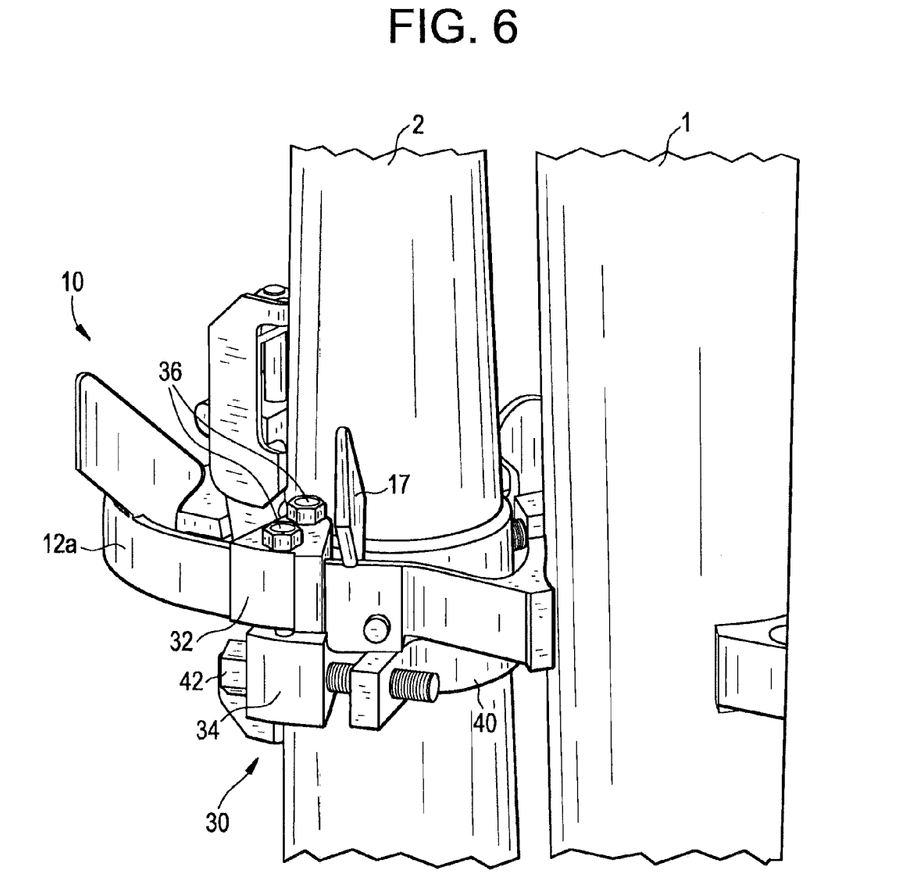
FIG. 6 is a side-view of a BWR jet pump inlet mixer support in use on a conventional BWR jet pump restrainer assembly, in accordance with an example embodiment.

FIG. 6 is a side-view of a BWR jet pump inlet mixer support 30 in use on a conventional BWR jet pump restrainer assembly 10, in accordance with example embodiments. Note that the inlet mixer support 30 is shown without the optional capture plate 46 (which is shown instead in FIG. 5) that may otherwise cover the location of set screw 15. Also note that some degree of separation is shown between the location of upper mounting block 32 and set screw guide ear 17. Alternatively to what is shown in FIG. 6, upper mounting block 32 may be positioned to fit snuggly against set screw guide ear 17, allowing guide ear 17 to act as a physical stop in the event that mounting block 32 may minutely slide along restrainer bracket 12.

Figure 7:
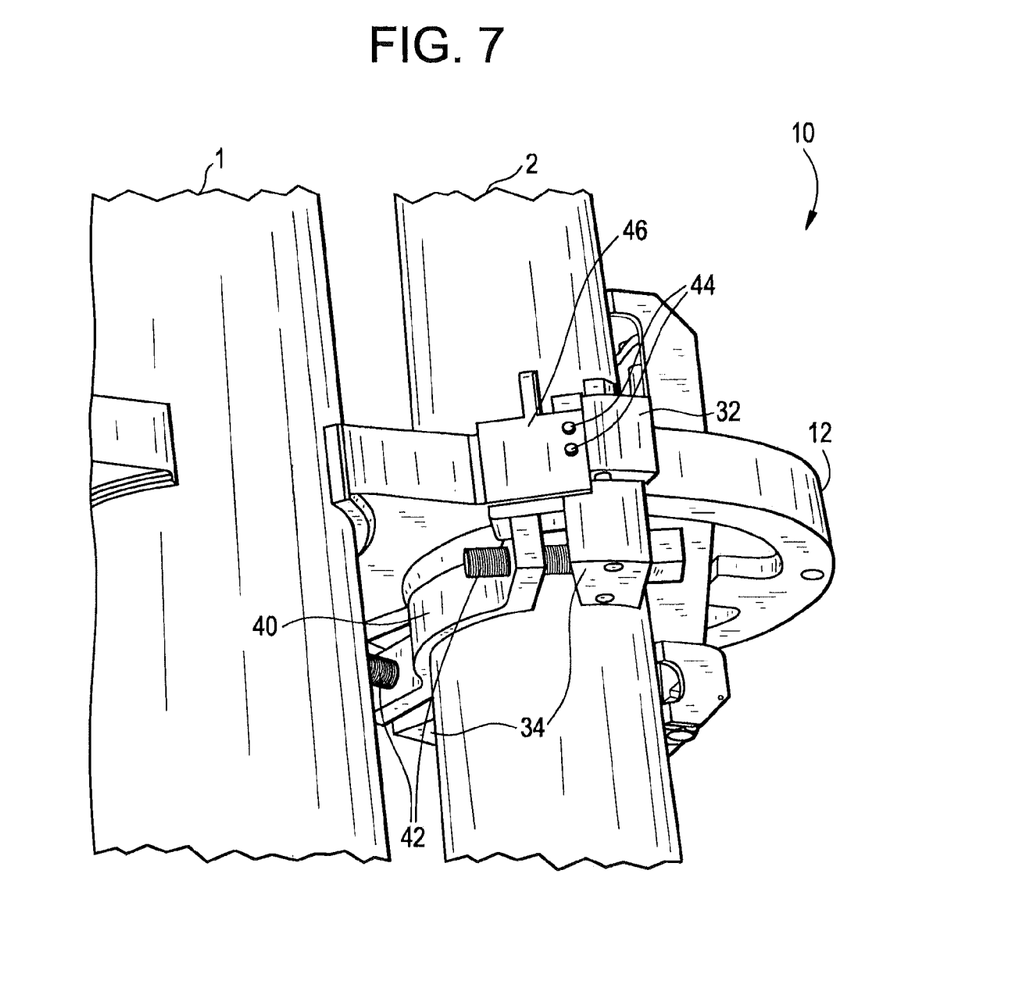
FIG. 7 is a bottom-view of a BWR jet pump inlet mixer support in use on a conventional BWR jet pump restrainer assembly, in accordance with an example embodiment.

FIG. 7 is a bottom-view of a BWR jet pump inlet mixer support 30 in use on a conventional BWR jet pump restrainer assembly 10, in accordance with example embodiments. In FIG. 7, the optional capture plate 46 is again shown covering the location of set screws 15 (set screws 15 are shown in FIG. 6, but are obstructed from view in FIG. 7). Note that FIG. 7 provides a better view of support band 40 interfacing with the inlet mixer 2. Support band 40 is shaped as a long, rectangular piece that includes a curvature matching the outer peripheral surface of inlet mixer 2 so that it may fit snuggly against the inlet mixer 2. Draw bolts 42 may be used to adjust the actual tension between support band 40 and lower mounting blocks 34. Enough tension may be applied via draw bolts 42 to stabilize movement of inlet mixer 2 and pull inlet mixer 2 away from the centerline of the riser pipe 1, especially in the case where a lateral side force may be applied to inlet mixers 2 to draw the inlet mixer 2 toward a centerline of riser piping 1.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An inlet mixer support for a Boiling Water Reactor (BWR) jet pump restrainer assembly, the support comprising:
   a support band with a first and second end, and
   at least a first and second mounting block attached to the first and second ends of the support band, respectively, the first and second mounting blocks being configured to attach to a restrainer bracket of the restrainer assembly, wherein the first and second mounting blocks each include an upper mounting block and a lower mounting block.

2. The support of claim 1, further comprising:
   a first and second draw bolt, the first draw bolt connected to the first end of the support band and the first lower mounting block, the second draw bolt connected to the second end of the support band and the second lower mounting block, the draw bolts being configured to adjust tension between the support band and the lower mounting blocks.

3. The support of claim 1, further comprising:
   at least one clamping bolt attaching each upper mounting block to the respective lower mounting block.

4. The support of claim 1, wherein the upper mounting blocks include a notch, the notch being configured to allow a vertical wall of the restrainer bracket to fit snuggly within the notch.

5. The support of claim 1, further comprising:
   a capture plate attached to each of the upper mounting blocks, the capture plates having a rectangular shape, and
   a pair of capture plate bolts, the capture plate bolts configured to attach the capture plates to the respective upper mounting blocks.

6. The support of claim 1, wherein the support band is a long thin band with a curvature that matches the outer peripheral surface of an inlet mixer.

* * * * *

UNITED STATES PATENT AND TRADEMARK OFFICE
CERTIFICATE OF CORRECTION

PATENT NO. : 8,731,134 B2
APPLICATION NO. : 12/851942
DATED : May 20, 2014
INVENTOR(S) : Michael S. DeFilippis Page 1 of 1

It is certified that error appears in the above-identified patent and that said Letters Patent is hereby corrected as shown below:

On the Title Page, item [56]

The following references are to be added to the Letters Patent:

U.S. PATENT DOCUMENTS

US 2010/242279        09/2010        Sprague et al.

FOREIGN PATENT DOCUMENTS

JP 2003-161795    06/2003
JP 2009-282025    12/2009
JP 2008-107345    05/2008
JP 2002-148381    05/2002
JP 2000-193785    07/2000
JP 2002-243887    08/2002
JP 2011-123064    06/2011
JP 2010-237207    10/2010

OTHER PUBLICATIONS

January 8, 2014 JP Office Action issued in corresponding Japanese Patent Application No. 2011-171556

Signed and Sealed this
Twenty-fifth Day of November, 2014

Michelle K. Lee
*Deputy Director of the United States Patent and Trademark Office*